United States Patent
Miranda

(10) Patent No.: US 10,830,872 B2
(45) Date of Patent: Nov. 10, 2020

(54) VEHICLE MULTI-RADAR RELATIVE PHASE INTERFEROMETRY ALIGNMENT SYSTEMS AND METHODS

(71) Applicant: Eliseo L Miranda, Detroit, MI (US)

(72) Inventor: Eliseo L Miranda, Detroit, MI (US)

(73) Assignee: FCA US LLC, Auburn Hills, MI (US)

( * ) Notice: Subject to any disclaimer, the term of this patent is extended or adjusted under 35 U.S.C. 154(b) by 279 days.

(21) Appl. No.: 16/002,524

(22) Filed: Jun. 7, 2018

(65) Prior Publication Data

US 2019/0377065 A1 Dec. 12, 2019

(51) Int. Cl.
*G01S 7/40* (2006.01)
*G01S 13/931* (2020.01)

(52) U.S. Cl.
CPC ........... *G01S 7/4026* (2013.01); *G01S 13/931* (2013.01); *G01S 2013/9325* (2013.01)

(58) Field of Classification Search
CPC ................. G01S 7/4026; G01S 13/931; G01S 2013/9325
USPC ........................................................ 342/173
See application file for complete search history.

(56) References Cited

U.S. PATENT DOCUMENTS

| | | | |
|---|---|---|---|
| 5,818,383 A | 10/1998 | Stockburger et al. | |
| 6,087,995 A | 7/2000 | Grace et al. | |
| 6,335,705 B1 | 1/2002 | Grace et al. | |
| 6,714,156 B1 | 3/2004 | Ibrahim et al. | |
| 6,828,931 B2 * | 12/2004 | Kikuchi | G01S 7/4026 342/174 |
| 7,522,096 B2 | 4/2009 | Backer et al. | |
| 8,692,707 B2 | 4/2014 | Lee et al. | |
| 2002/0105456 A1 * | 8/2002 | Isaji | G01S 7/4026 342/165 |
| 2016/0084942 A1 * | 3/2016 | Mizutani | G01S 13/04 701/96 |
| 2016/0161602 A1 | 6/2016 | Prokhorov | |
| 2019/0353780 A1 * | 11/2019 | Statnikov | G01S 13/9047 |

OTHER PUBLICATIONS

Chau, J.L., et al., "Phase calibration approaches for radar interferometry and imaging configurations: equatorial spread F results", ww.ann-geophys.net/26/2333/2008/, V. 26, p. 2333-2343 (2008).

(Continued)

*Primary Examiner* — Frank J McGue
(74) *Attorney, Agent, or Firm* — Ralph E Smith

(57) ABSTRACT

An alignment system and method for a vehicle having a plurality of radar devices utilize a plurality of alignment devices configured to transmit or reflect radar waves towards the vehicle for receipt by the plurality of radar devices and a controller configured to command one of the plurality of alignment devices to perform a base alignment routine of one of the plurality of radar devices to obtain a base alignment, receive, via the plurality of radar devices, reflected radar waves, determine actual phase differences between the reflected radar waves, and based on the determined actual phase differences between the reflected radar waves, the base alignment, and predetermined alignments of a remainder of the plurality of radar devices, generate and output instructions for adjusting the alignment of at least some of the remainder of the plurality of radar devices.

10 Claims, 5 Drawing Sheets

(56) References Cited

OTHER PUBLICATIONS

Guerin, Daniel, et al., "Phase Interferometry Direction Finding", Lincoln Laboratory Massachusetts Institute Technology, Group 108, p. 1-35 (Oct. 01, 2012).
O'Donnell, Robert M. Dr., "Radar Systems Engineering Lecture 4—The Radar Equation", Radar Systems Course, p. 1-50 (Jan. 1, 2010).

* cited by examiner

VEHICLE MULTI-RADAR RELATIVE PHASE INTERFEROMETRY ALIGNMENT SYSTEMS AND METHODS

FIELD

The present application generally relates to vehicle radar systems and, more particularly, to vehicle multi-radar relative phase interferometry alignment systems and methods.

BACKGROUND

Some vehicles include radar devices that transmit radar waves and receive reflected radar waves. One example radar device is a central, front-facing radar device that is utilized to detect objects in front of the vehicle, such as for adaptive cruise control (ACC) or front collision avoidance. Some vehicles include additional radar devices implemented in other locations on the vehicle. For example, rear-facing radar devices and/or side-facing radar devices could be implemented and utilized for blind spot monitoring and/or other autonomous driving features. Conventional vehicle radar alignment systems only align the central, front-facing radar device using a slow process whereby an alignment device is arranged in front of the radar device. The other radar devices on the vehicle, however, could be misaligned, which in turn could negatively impact the performance of the corresponding vehicle operation features described above. Accordingly, while such vehicle radar alignment systems work well for their intended purpose, there remains a need for improvement in the relevant art.

SUMMARY

According to one aspect of the invention, an alignment system for a vehicle having a plurality of radar devices is presented. In one exemplary implementation, the system comprises a plurality of alignment devices configured to transmit or reflect radar waves towards the vehicle for receipt by the plurality of radar devices and a controller configured to: command one of the plurality of alignment devices to perform a base alignment routine of one of the plurality of radar devices to obtain a base alignment, receive, via the plurality of radar devices, reflected radar waves, determine actual phase differences between the reflected radar waves, and based on the determined actual phase differences between the reflected radar waves, the base alignment, and predetermined alignments of a remainder of the plurality of radar devices, generate and output instructions for adjusting the alignment of at least some of the remainder of the plurality of radar devices.

In some implementations, the predetermined alignments of the remainder of the plurality of radar devices are predetermined phase differences between the plurality of radar devices when properly aligned. In some implementations, the outputting of the instructions causes a human operator to manually adjust the alignment of at least some of the remainder of the plurality of radar devices. In some implementations, the controller is further configured to command actuators associated with at least some of the remainder of the plurality of radar devices to automatically adjust their alignment according to the instructions.

In some implementations, the plurality of radar devices include at least one front-facing radar device, at least one side-facing radar device, and at least one rear-facing radar device. In some implementations, the one of the plurality of radar devices associated with the base alignment routine is a central, front-facing radar device. According to another aspect of the invention, an alignment bay in a vehicle assembly plant is presented. In one exemplary implementation, the alignment bay comprises at least a portion of the alignment system described above and is configured to receive the vehicle.

According to another aspect of the invention, a method for alignment of a plurality of radar devices of a vehicle is presented. In one exemplary implementation, the method comprises: providing a plurality of alignment devices configured to transmit or reflect radar waves towards the vehicle for receipt by the plurality of radar devices, commanding, by a controller, one of the plurality of alignment devices to perform a base alignment routine of one of the plurality of radar devices to obtain a base alignment, receiving, by the controller via the plurality of radar devices, reflected radar waves, determining, by the controller, actual phase differences between the reflected radar waves, and based on the determined actual phase differences between the reflected radar waves, the base alignment, and predetermined alignments of a remainder of the plurality of radar devices, generating and outputting, by the controller, instructions for adjusting the alignment of at least some of the remainder of the plurality of radar devices.

In some implementations, the predetermined alignments of the remainder of the plurality of radar devices are predetermined phase differences between the plurality of radar devices when properly aligned. In some implementations, the outputting of the instructions causes a human operator to manually adjust the alignment of at least some of the remainder of the plurality of radar devices. In some implementations, the method further comprises commanding, by the controller, actuators associated with at least some of the remainder of the plurality of radar devices to automatically adjust their alignment according to the instructions.

In some implementations, the plurality of radar devices include at least one front-facing radar device, at least one side-facing radar device, and at least one rear-facing radar device. In some implementations, the one of the plurality of radar devices associated with the base alignment routine is a central, front-facing radar device. In some implementations, the method is executable by an alignment bay in a vehicle assembly plant, the alignment bay being configured to receive the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As discussed above, only a central, front-facing radar device of a vehicle is typically aligned. When the vehicle has other radar devices, these radar devices could be misaligned, which could negatively impact the systems associated therewith. Each radar device could be individually aligned using the same process used for the central, front-facing radar device. This process, however, would be very time consuming. This would also require a substantial amount of floor space in a vehicle assembly plant. Accordingly, improved alignment systems and methods are presented for multi-radar vehicles. These systems and methods utilize relative phase interferometry to align the radar devices relative to each other. The term "interferometry" generally refers to the superimposing or comparing of different radar waves and extracting information therefrom. Potential benefits of these systems and methods include faster alignment and more accurate radar performance, while not requiring a substantial amount of vehicle assembly plant floor space.

Figure 1:
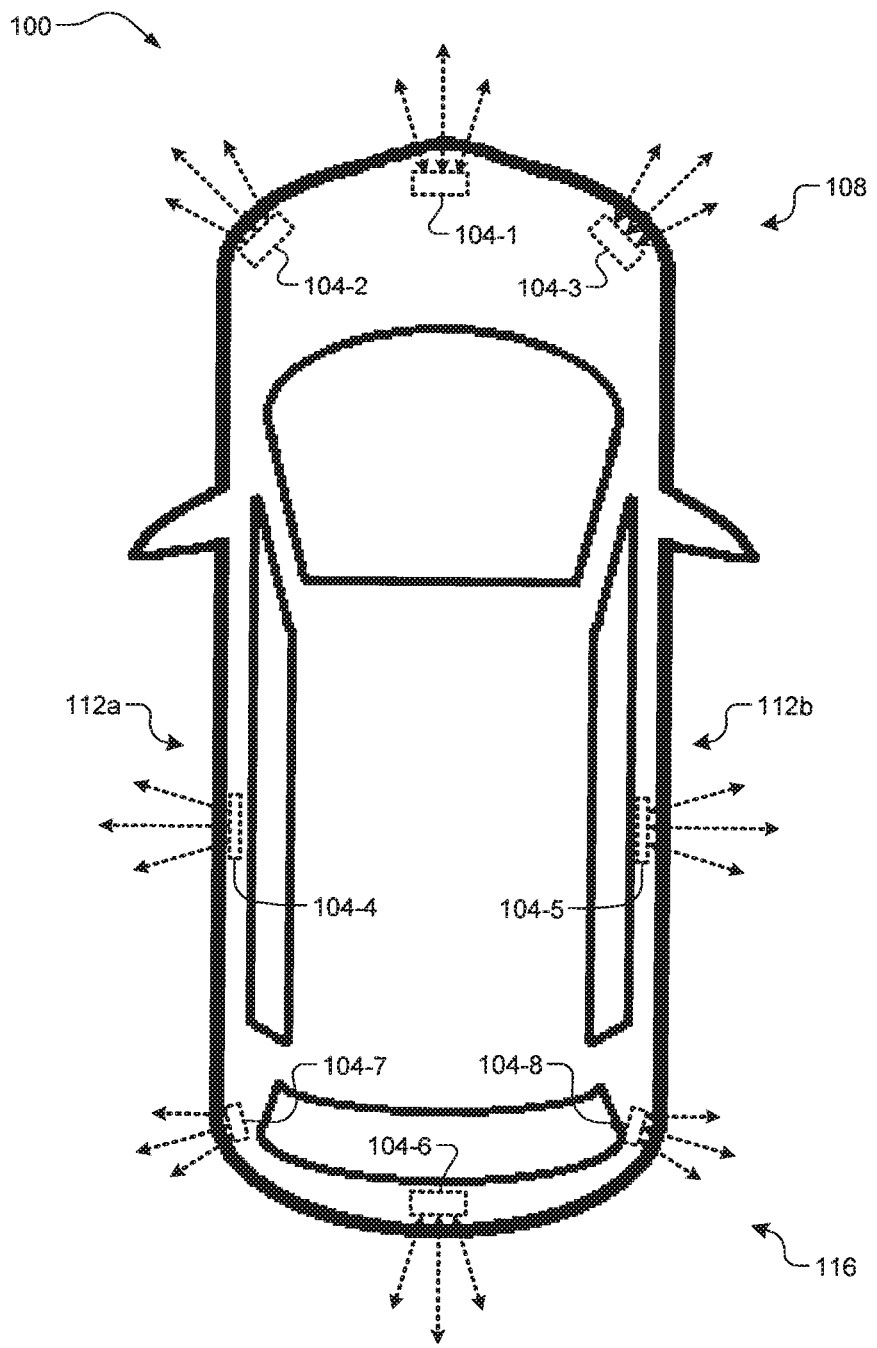
FIG. 1 is an overhead view of an example vehicle having a plurality of radar devices according to some implementations of the principles of the present disclosure.

Referring now to FIG. 1, an overhead view of an example vehicle 100 having a plurality of radar devices 104-1 . . . 104-8 (collectively "radar devices 104") is illustrated. While eight radar devices 104 are illustrated, it will be appreciated that the vehicle 100 could comprise any quantity of two or more radar devices. As illustrated, the radar devices 104 comprise three front-facing radar devices 104-1, 104-2, and 104-3 (e.g., integrated into a front bumper or fascia 108), two side-facing radar devices 104-4 and 104-5 (e.g., integrated into side panels 112a and 112b, respectively), and three rear-facing radar devices 104-6, 104-7, and 104-8 (e.g., integrated into a rear bumper or fascia 116). It will be appreciated that other configurations of the radar devices 104 could be implemented.

Figure 2:
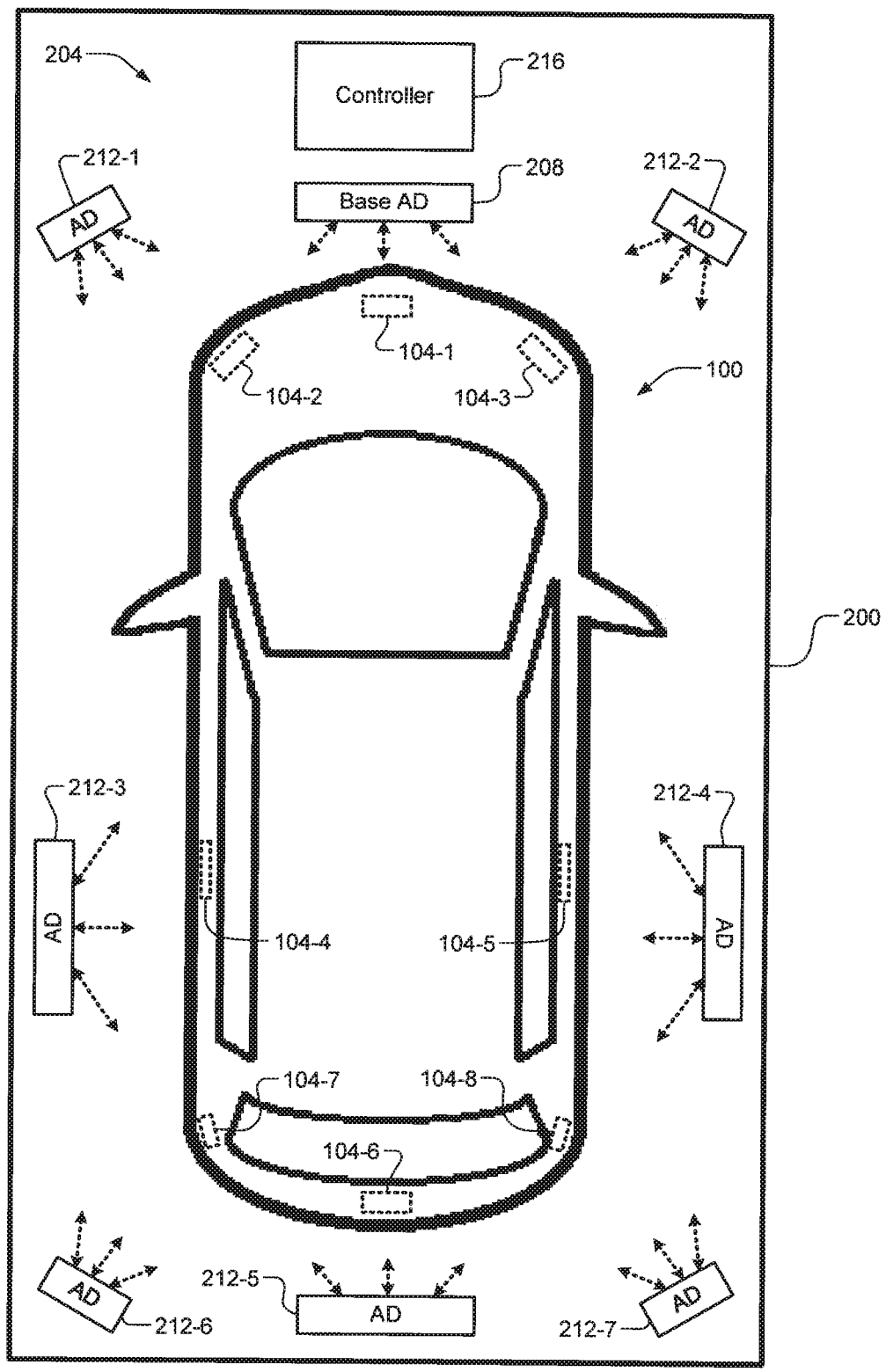
FIG. 2 is an overhead view of the vehicle of FIG. 1 positioned in an alignment bay having an example radar alignment system according to the principles of the present disclosure.

Referring now to FIG. 2, an overhead view of the vehicle 100 in an example alignment bay 200 of a vehicle assembly plant is illustrated. The alignment bay 200 is configured to receive the vehicle 100 and also includes an alignment system 204 according to the principles of the present disclosure. The alignment system 204 comprises a base alignment device (AD) 208 that is configured to be utilized in performing a base alignment routine for the central front-facing radar device 104-1. The alignment system 204 further comprises other alignment devices (AD) 212-1 . . . 212-7 (collectively "alignment devices 212") arranged around a perimeter of the alignment bay 200. While a total of eight alignment devices 208 and 212 are illustrated, it will be appreciated that other numbers of alignment devices could be implemented and/or could be configured in different locations with respect to the alignment bay 212.

These alignment devices 208 and 212 could be radar transmitters or reflectors (e.g., retroreflectors). As shown, some of the alignment devices 208, 212 transmit or reflect radar waves towards multiple radar devices 104 in order to provide a measurable phase difference. The alignment system 204 further comprises a controller 216, which could be a controller of the vehicle 100 (e.g., an engine control unit, or ECU) or a separate controller. The controller 216 controls the alignment devices 208 and 212 to perform an alignment procedure of the radar devices 104 of the vehicle 100. This includes initially performing the base alignment routine with respect to the central, front-facing radar device 104-1. Once this base alignment routine is completed, a secondary alignment routine is performed during which the controller 216 commands the alignment devices 208 and/or 212 to transmit or reflect radar waves towards the various radar devices 104. The radar waves captured by the various radar devices 104 are then compared by the controller to determine phase differences.

Figure 3:
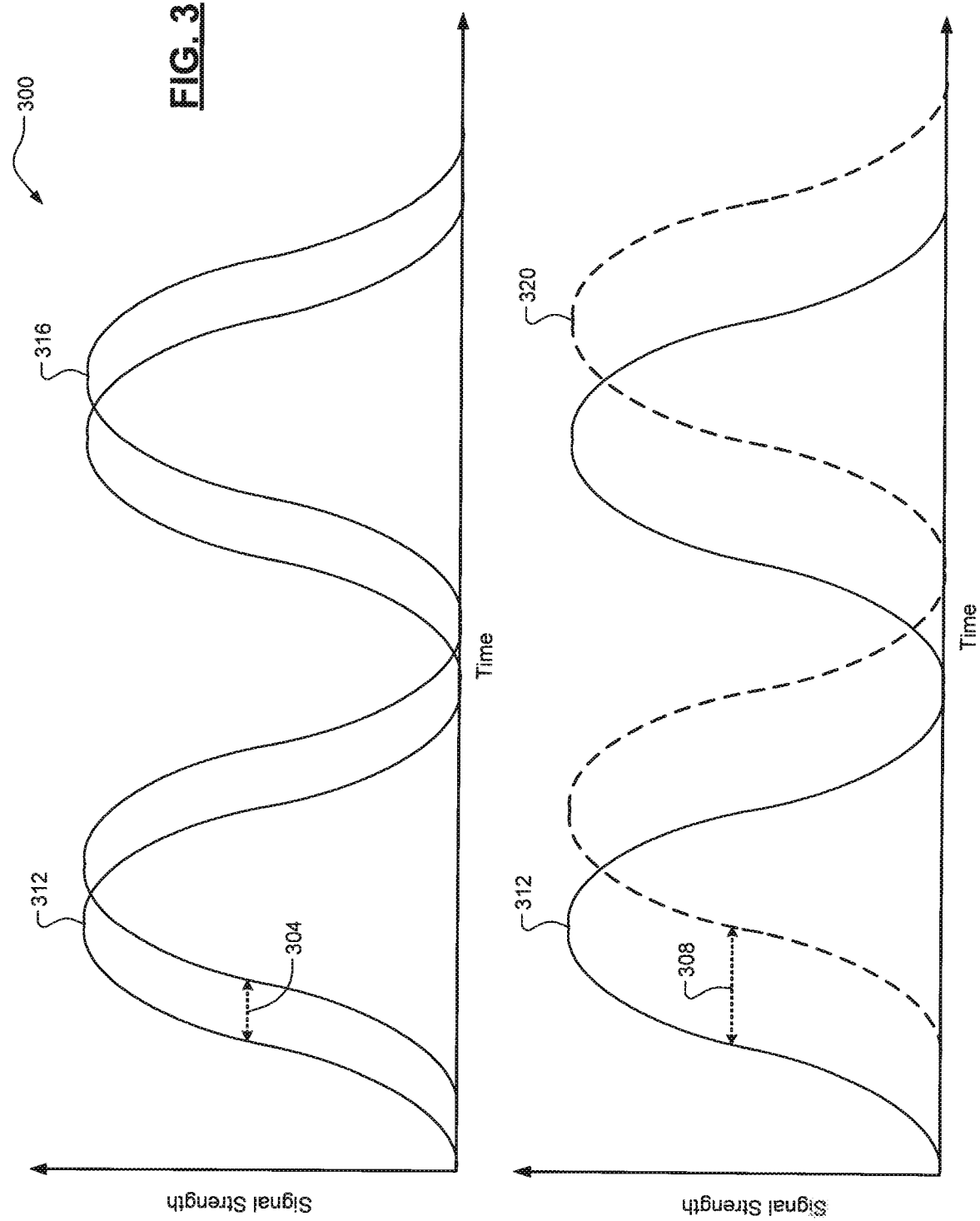
FIG. 3 is a plot of expected versus actual radar phase differences between radar waves captured by a plurality of radar devices according to the principles of the present disclosure.

FIG. 3 illustrates example plots 300 showing an actual phase difference 304 versus an expected or known phase difference 308 between radar waves 312, 316 captured by different radar devices (and an expected radar wave 320). In one exemplary implementation, the upper plot illustrates the radar wave 312 as captured by the already aligned central, front-facing radar device 104-1 and the radar wave 316 as captured by another radar device, such as radar device 104-2, whereas the lower plot illustrates the radar wave 312 and an expected radar wave 320 that should be captured by the other radar device (e.g., radar device 104-2). The expected or known phase difference 308 is predetermined for a properly or correctly aligned system. The degree of difference between the actual and known phase differences 304 and 308 corresponds to a degree of misalignment of the system.

Figure 4:
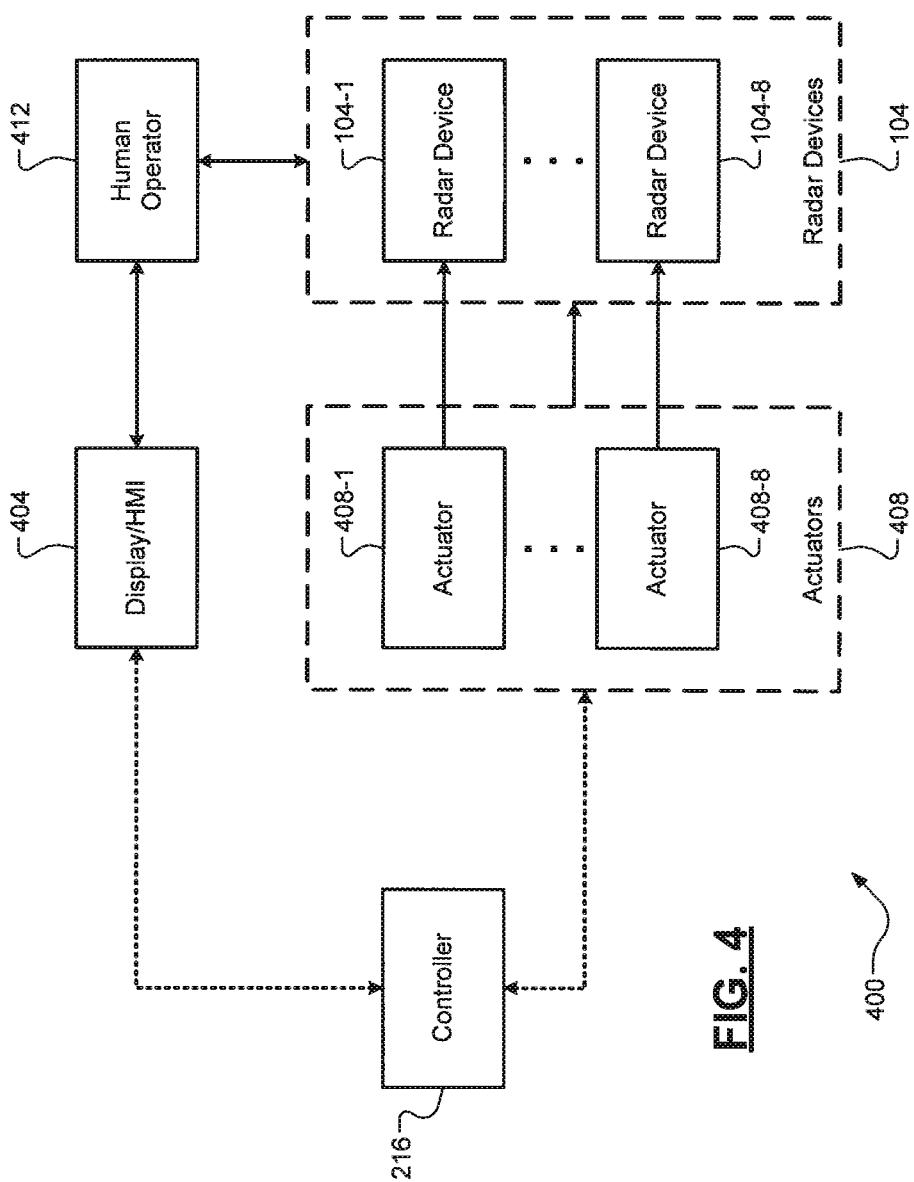
FIG. 4 is a functional block diagram of an example radar alignment system according to the principles of the present disclosure.

Based on the determined phase differences, the controller 216 can then generate and output instructions for alignment of the radar devices 104. FIG. 4 illustrates an example functional block diagram of another portion 400 of the alignment system 204, which could include a display or a human-machine interface (HMI) 404 and/or actuators 408-1 . . . 408-8 (collectively "actuators 408") for the respective radar devices 104. The display or HMI 404 could be configured to display instructions to a human operator 412 for manual alignment of the radar devices 104 (e.g., using a screw-actuated adjustment device). These displayed instructions could be continuously updated until the human operator 412 has successfully manually aligned the radar devices 104. Alternatively, the actuators 408 (e.g., stepper motors) could be electronically controlled by the controller 216 to automatically align the radar devices 104 according to the generated instructions. In one exemplary implementation, the actuators 408 are integrated into the radar devices 104 such that the radar devices 104 are able to self-align in response to the alignment instructions.

Figure 5:
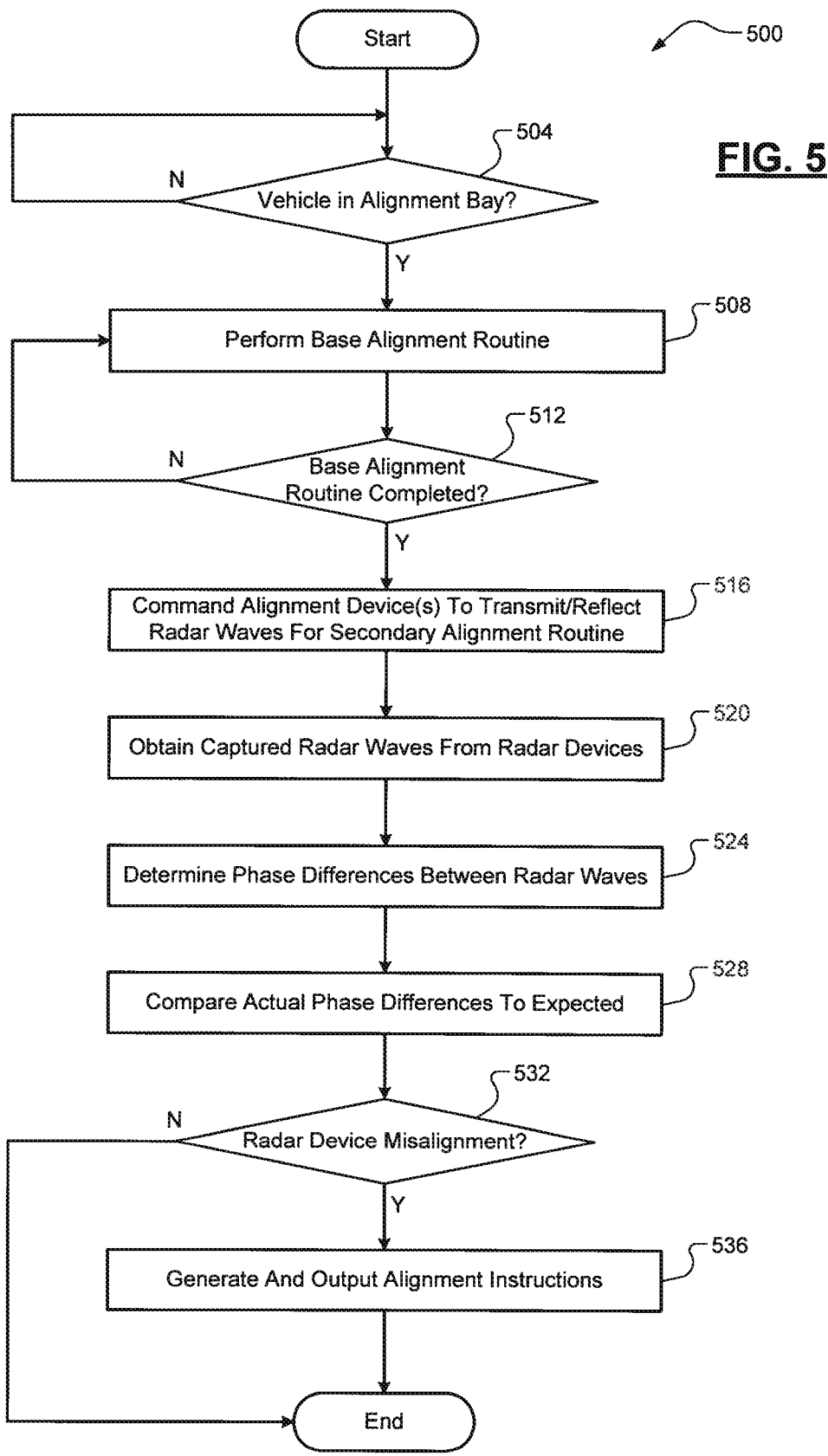
FIG. 5 is a flow diagram of an example method of relative phase interferometry alignment for a vehicle having a plurality of radar devices according to the principles of the present disclosure.

Referring now to FIG. 5, a flow diagram of an example method 500 of relative phase interferometry alignment for the radar devices 104 of the vehicle 100 is illustrated. At 504, the controller 216 determines whether the vehicle 100 is properly positioned in the alignment bay 204. When true, the method 200 proceeds to 508. When false, the method 500 ends or returns to 504. At 508, the controller 216 commands at least the base alignment device 208 to perform the base alignment procedure for the central, front-facing radar device 104-1. At 512, the controller 216 determines whether the base alignment procedure has successfully completed. When true, the method 500 proceeds to 516. When false, the method 500 ends or returns to 508. At 516, the controller 216 commands at least some of the alignment devices 208, 212 to begin a secondary alignment routine by transmitting or reflecting radar waves towards the radar devices 104. At 520, the controller 216 obtains the radar waves captured by the radar devices 104. At 524, the controller 216 determines actual phase differences between the radar waves. At 528, the controller 216 compares the actual phase differences to expected or known (e.g., predetermined) phase differences for a properly aligned system. At 532, the controller 216 determines whether any of the radar devices 104 are misaligned. When true, the method 500 proceeds to 536. When false, the method 500 ends. At 536, the controller 216 generates and outputs instructions (e.g., visual and/or computer-executable) that cause the alignment of the radar devices 104 (e.g., by a human operator and/or actuators 408). The method 500 then ends or returns to 504, such as for another execution for another vehicle in the assembly line.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An alignment system for a vehicle having a plurality of radar devices, the system comprising:
    a plurality of alignment devices configured to transmit radar waves or reflect radar waves generated by the plurality of radar devices towards the vehicle for receipt by the plurality of radar devices; and
    a controller configured to:
        command one of the plurality of alignment devices to perform a base alignment routine of a central, front-facing radar device of the plurality of radar devices to obtain a base alignment indicative of an alignment of the central, front-facing radar device;
        receive, via the plurality of radar devices, the transmitted or reflected radar waves to obtain received radar waves;
        determine actual phase differences between the received radar waves; and
        based on the determined actual phase differences between the received radar waves, the base alignment, and predetermined alignments of a remainder of the plurality of radar devices, generate and output instructions for adjusting the alignment of at least some of the remainder of the plurality of radar devices,
        wherein the predetermined alignments of the remainder of the plurality of radar devices are predetermined phase differences between the plurality of radar devices when properly aligned.

2. The system of claim 1, wherein the alignment of at least some of the remainder of the plurality of radar devices is configured to be manually adjustable upon the outputting of the instructions.

3. The system of claim 1, wherein the controller is further configured to command actuators integrated with at least some of the remainder of the plurality of radar devices to automatically adjust their alignment according to the instructions.

4. The system of claim 1, wherein the plurality of radar devices further includes at least one other front-facing radar device, at least one side-facing radar device, and at least one rear-facing radar device.

5. An alignment bay in a vehicle assembly plant, the alignment bay comprising at least a portion of the alignment system of claim 1 and being configured to receive the vehicle.

6. A method for alignment of a plurality of radar devices of a vehicle, the method comprising:
    providing a plurality of alignment devices configured to transmit radar waves or reflect radar waves generated by the plurality of radar devices towards the vehicle for receipt by the plurality of radar devices;
    commanding, by a controller, one of the plurality of alignment devices to perform a base alignment routine of a central, front-facing radar device of the plurality of radar devices to obtain a base alignment indicative of an alignment of the central, front-facing radar device;
    receiving, by the controller via the plurality of radar devices, the transmitted or reflected radar waves to obtain received radar waves;
    determining, by the controller, actual phase differences between the received radar waves; and
    based on the determined actual phase differences between the received radar waves, the base alignment, and predetermined alignments of a remainder of the plurality of radar devices, generating and outputting, by the controller, instructions for adjusting the alignment of at least some of the remainder of the plurality of radar devices,
    wherein the predetermined alignments of the remainder of the plurality of radar devices are predetermined phase differences between the plurality of radar devices when properly aligned.

7. The method of claim 6, wherein the alignment of at least some of the remainder of the plurality of radar devices is configured to be manually adjustable upon the outputting of the instructions.

8. The method of claim 6, further comprising commanding, by the controller, actuators associated with at least some of the remainder of the plurality of radar devices to automatically adjust their alignment according to the instructions.

9. The method of claim 6, wherein the plurality of radar devices further includes at least one other front-facing radar device, at least one side-facing radar device, and at least one rear-facing radar device.

10. The method of claim 6, wherein the method is executable by an alignment bay in a vehicle assembly plant, the alignment bay being configured to receive the vehicle.

\* \* \* \* \*